Feb. 26, 1935.   S. ESTRADA ET AL   1,992,479
APPARATUS FOR EXTRACTING THE MILK OF A COCOANUT
Original Filed July 6, 1933
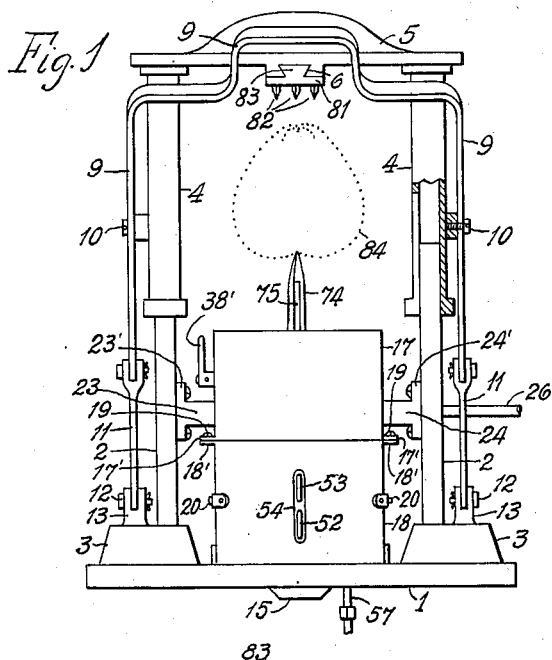
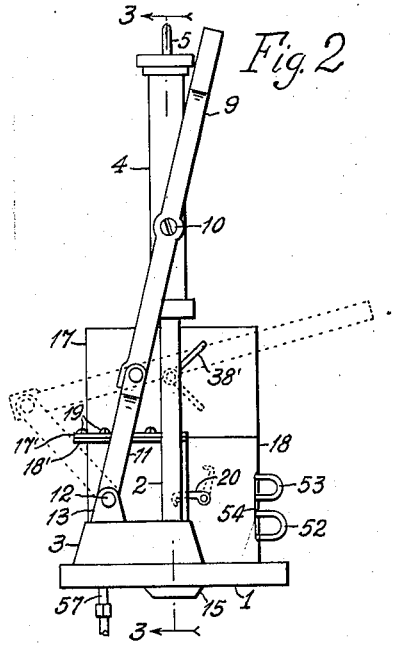
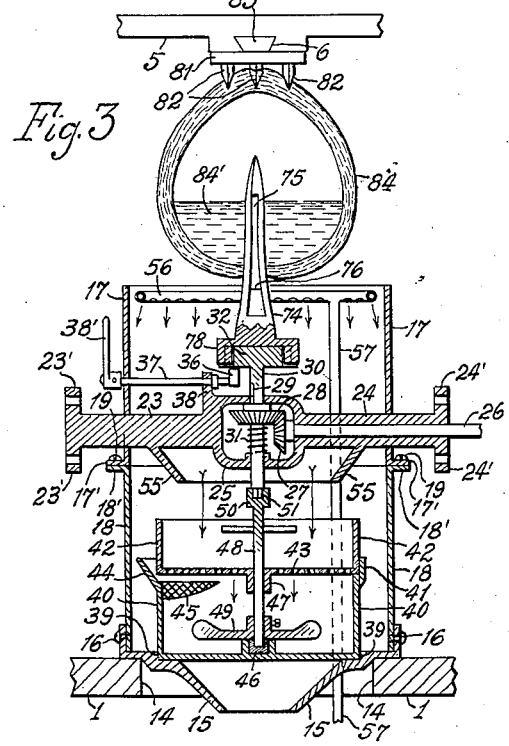
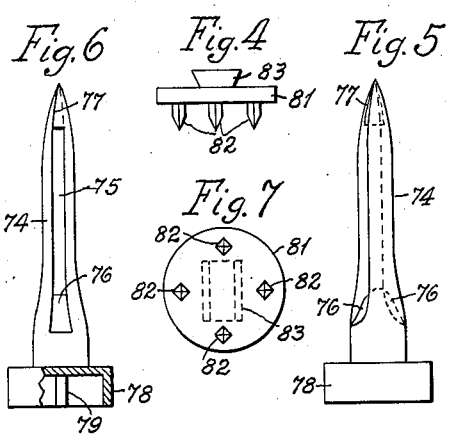
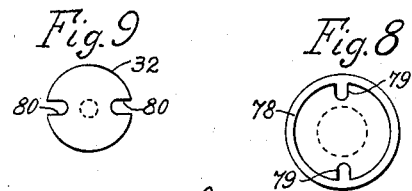

Patented Feb. 26, 1935

1,992,479

UNITED STATES PATENT OFFICE 1,992,479

APPARATUS FOR EXTRACTING THE MILK OF A COCOANUT

Santiago Estrada, Enrique Mauri, and Armando Ivey, Habana, Cuba

Original application July 6, 1933, Serial No. 679,250. Divided and this application February 12, 1934, Serial No. 710,919. In Cuba May 18, 1933

3 Claims. (Cl. 146—7)

This application is a division of application Ser. No. 679,250, filed July 6, 1933, for Apparatus for extracting fruit juice, and it has for its object to provide an apparatus for extracting the milk of a cocoanut, in which the cocoanut is submitted to the action of a rotatory piercer device which at the same time pierces the cocoanut, it draws out the milk contained in the cocoanut through the hollow inner space of the piercer, the apparatus having also means for holding the cocoanut on the piercer, whilst its milk is drawn out, this apparatus being so constructed and arranged that it can be handled by any person without fear of complications of any sort.

The invention is described with reference to the figures of the annexed drawing, of which:

Fig. 1 is a front elevation view of the apparatus in its inoperative position.

Fig. 2 is a side elevation view of the apparatus in the same position.

Fig. 3 is a vertical section of the apparatus on line 3—3 of Fig. 2, showing the whole inner structure of the same, in its operative position.

Figs. 4 and 5 are details showing in outer side elevation the holding piece and the piercer used for extracting the milk of a cocoanut.

Fig. 6 is a detailed front elevation view of the same piercer partly in section at its base.

Fig. 7 is a lower plan view of the piece for holding the cocoanut.

Fig. 8 is a lower plan view of the base of the piercer.

Fig. 9 is an upper plan view of the rotatory head adapted for supporting the piercer.

This apparatus is composed of a base 1 upon which are two standards 2 spaced from each other and reinforced at their base by foundations 3. This base 1 has suitable holes for fixing it by means of bolts upon a suitable counter, table or furniture. Slidably mounted on the standards 2 is a vertical frame open at its bottom and whose sides 4 are hollow columns guided upon the standards 2, and the transversal bar 5 forming the top of the slidable frame shows at the middle of its lower face a transversal head forming a guide of swallow-tail section 6 for the head 83 of corresponding shape of a holding piece formed by a disc 81 provided with four teeth 82 to retain in position the cocoanut 84 when it is pierced and its milk drawn out, without permitting it to rotate.

The holding piece 81 receives together with the slidable frame 4, 5, an alternative motion which is caused by manually operating a handle formed at the top of an inverted U-shaped swingbar 9 pivotally mounted at intermediate points of its branches on horizontal pivots 10 fixed to the hollow columns 4, the branches being pivotally connected at their lower ends to connecting bars 11 which are also connected at their lower ends to horizontal pivots 12 supported on brackets 13 fixed to the foundations 3. In Fig. 2 are respectively shown in full lines and dotted lines the upper and lowest positions of the swingbar 9 and of the connecting bars 11 corresponding to the upper and lowest positions of the holding piece 81.

The base 1 shows vertically beneath the slidable frame 4, 5, a circular opening 14 upon which fits a funnel-shaped open base 15 provided with a vertical flange to which is fixed by means of screws 16 the stationary portion of a cylindrical cover horizontally divided into two halves 17 and 18 connected together by means of flanges 17' and 18' at their adjacent edges which are secured to each other by means of bolts 19, the lower portion 18 of the cylindrical cover having one-half detachable and secured by means of clamps 20 to the stationary portion thereof when the containers for the pulp and the extracted milk are enclosed in the cover.

The upper half 17 of the cylindrical cover is integral with two brackets one solid 23 and another hollow 24 in horizontal alignment, which are connected at the center by a casing 25 designed to contain a suitable draw-gear. The brackets 23 and 24 project beyond the cylindrical cover 17 and they are provided with vertical flanges 23' and 24' which serve to fix them by means of screws to the standards 2 through a suitable slot in the respective column 4. Within the hollow bracket 24 is rotatorily mounted a horizontal shaft 26 provided within the casing 25 with a bevelled pinion 27 meshing with another bevelled pinion 28 slidably carried by means of a wedge 29 on a vertical shaft 30 rotatorily mounted in journal bearings formed at the upper and lower portions of the casing 25 so that the shaft 30 can slide under the pinion 28 without this pinion 28 failing to mesh with the pinion 27, as the former is pressed upwardly by a coil spring 31 rolled upon the vertical shaft 30 within the casing 25.

The shaft 30 carries at its upper end a head 32 in form of a disc having two diametrically opposed grooves 80 adapted to engage two diametrically opposed vertical ribs 79 formed at the inner periphery of a downward flange 78 projecting from an annular base of a piercer 74 which is used for extracting the milk of the cocoanut 84.

The shaft 30 may be lifted or let down by means of a cam 36 fixed at the end of a horizontal shaft 37 rotatorily mounted on a bracket 38 integrally formed at the top of the casing 25 and through an opening formed in the cylindrical cover 17, said shaft 37 ending outside this cover in a handle 38 for its operation, as shown in Fig. 3 of the drawing. The bottom of the head 32 rests on the cam 36 and when the latter is rotated along with the shaft 37, it causes the head 32 to lift and with the same is lifted the slidable shaft 30 for the purpose explained hereinafter. The shaft 26 is coupled to any power producing means as the shaft of an electric motor or to a shaft manually operated by a handle.

On a recess 39 formed in the funnel-shaped base 15 is mounted a cylindrical container 40 open at its top and which forms at its upper edge a seat with a flange 41 adapted to receive a second cylindrical container 42 open at its top the perforated bottom 43 of which properly forms a strainer, the lower container 40 having a slanting mouth 44 at its front to discharge the strained and stirred milk of the cocoanut, and adjacent to said mouth is placed a straining plate in the shape of a segment 45, so that upon inclining the containers the cocoanut milk coming out through the mouth 44 may be strained again.

On bushings 46 and 47 formed on the bottom of both containers 40 and 42 is rotatorily mounted a vertical shaft 48 which is provided with a blade-stirrer 49 within the lower container 40 and said shaft 48 has at its upper end a square-hollow head 50 adapted to couple with another solid square head 51, formed at the lower end of the shaft 50 with which is in vertical alignment said vertical shaft 48, when said shaft 30 is let down by the cam 36. The containers 40 and 42 are respectively provided with handles 52 and 53 positioned at the front of the apparatus and which project outside the detachable half of the cover 18 through a slot 54. The cocoanut milk dropping from the piercer 74 is guided to the upper container 42 through a guiding funnel 55 integrally formed with the horizontal brackets 23 and 24.

For piercing the cocoanut 84 it is provided a piercer 74 (Figs. 4 and 5) which has in its body a hollow space 75 open toward the sides thereof and closed at the bottom by a central protuberance 76 having two opposed curved surfaces slanting toward the sides to serve as a guide outside the cocoanut for the milk pouring by gravity from the cocoanut in its retained position and which passes to the hollow space 75 through a triangular vane 77 laterally formed at the point of the piercer 74.

For cleaning and washing the apparatus, an annular tube provided with lower perforations 56 is arranged in the upper part of the cover 17 and inside thereof, which is in communication through a tube 57 with a water-pipe.

The operation of the apparatus is as follows: a cocoanut 84 is taken and placed vertically with its peduncle connecting end directly above the point of the piercer 74, such as shown by dotted lines in Figure 1 of the drawing. Then the horizontal shaft 26 is put into operation by means of any power supplying means, and upon said shaft 26 is rotating, its motion is transmitted to the vertical shaft 30 by means of the bevelled pinions 27, 28, whereupon the piercer 74 will rotate. Immediately the disc 81 is caused to descend by grasping with the hand the handle and causing the swing-bar 9 to rotate on its horizontal pivots 10, whereupon the hollow columns 4 will slide down upon the standards 2 until the teeth 82 of the disc 81 pierce upon the cocoanut 84 and retain it in position against rotation. At the same time that the swing-bar 9 descends, the cocoanut 84 is pushed thereby against the point of the rotating piercer 74 and this is introduced into the cocoanut 84 until it takes the position shown in full lines in Fig. 3, whereupon the milk 84' contained in the cocoanut 84 passes out through the triangular vane 77 of the piercer 74 into the hollow space 75 thereof and it is poured by gravity outwards guided by the slanting surfaces forming the bottom 76 of said hollow space. The milk of the cocoanut is subsequently re-collected in the upper container 42 through the guiding funnel 55, and it strains through the perforations of bottom 43 and is received in the second container 40 where it is stirred by the blade-stirrer 49. When it is desired to consume the milk of the cocoanut, the detachable half 18 of the cylindrical cover is removed, and by means of the handle 38 the cam 36 is caused to rotate and raise the head 32 of the shaft 30 to disconnect this shaft 30 from the lower shaft 48, whereupon the two containers 42 and 40 can be drawn out.

Within the lower container 40 crushed ice and sugar may be added to the cocoanut milk, in order to serve it directly to the consumer, once stirred.

What we claim is:

1. An apparatus for extracting the milk of a cocoanut which comprises a supporting frame, a vertical shaft rotatorily mounted on said supporting frame, a piercer detachably mounted on the upper end of said shaft, and which has a hollow space open at the sides and closed at the bottom by a protuberance having two opposed surfaces slanting toward the sides, and movable means to cooperate with the piercer to retain the cocoanut against rotation while the cocoanut is pierced by the piercer, said slanting surfaces of the piercer serving as a guide outside the cocoanut for the milk pouring by gravity from the cocoanut in its retained position.

2. An apparatus for extracting the milk of a cocoanut, which comprises a supporting frame, a vertical shaft rotatorily mounted on said supporting frame, a piercer which is detachably mounted on the upper end of said shaft and which has a hollow space open at the sides to guide outwards the milk entering through a vane near the point of the piercer, a pair of standards outside the supporting frame and to which the supporting frame is secured, a pair of hollow columns connected together at the top by a transversal bar and reciprocally mounted on said standards, a toothed piece mounted at the center of the transversal bar connecting the reciprocating hollow columns to cooperate with the piercer to retain the cocoanut against rotation while the cocoanut is pierced by the piercer, and a receiving container placed below the supporting frame for receiving the cocoanut milk.

3. An apparatus for extracting the milk of a cocoanut, which comprises a supporting cover, brackets connected to said cover in horizontal alignment and connected to each other by a casing, a horizontal shaft rotatorily mounted on one of said brackets, a vertical shaft rotatorily and slidably mounted through said casing, bevelled gears within said casing to rotatorily connect both horizontal and vertical shafts, a piercer detachably mounted on the upper end of the vertical shaft and having a hollow space open at the sides to guide outwards the milk entering through a vane adjacent the point of the piercer, a pair of standards outside the cover, a pair of hollow columns connected together at the top by a transversal bar and reciprocally mounted on said standards, a teethed piece mounted at the center of the top of the transversal bar connecting the reciprocating hollow columns to cooperate with the piercer to retain the cocoanut against rotation while it is pierced and emptied from its milk, a receiving container for the pulp and the milk and another receiving container for the milk alone, the former container being superposed to the latter, the former having its bottom perforated to strain, and the latter having a blade-stirrer whose vertical shaft is detachably connected to the vertical shaft above mentioned, and means for rotating said horizontal shaft from any power supplying means.

SANTIAGO ESTRADA.
ENRIQUE MAURI.
ARMANDO IVEY.